(No Model.)
H. E. BRAUNFELD.
FIRE ESCAPE.
No. 316,870. Patented Apr. 28, 1885.
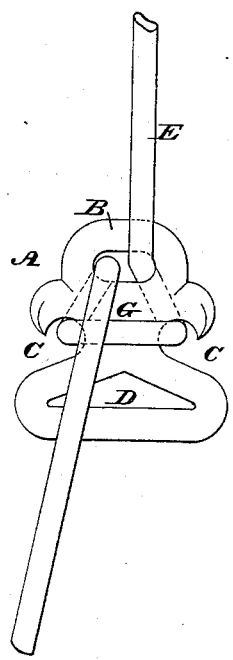
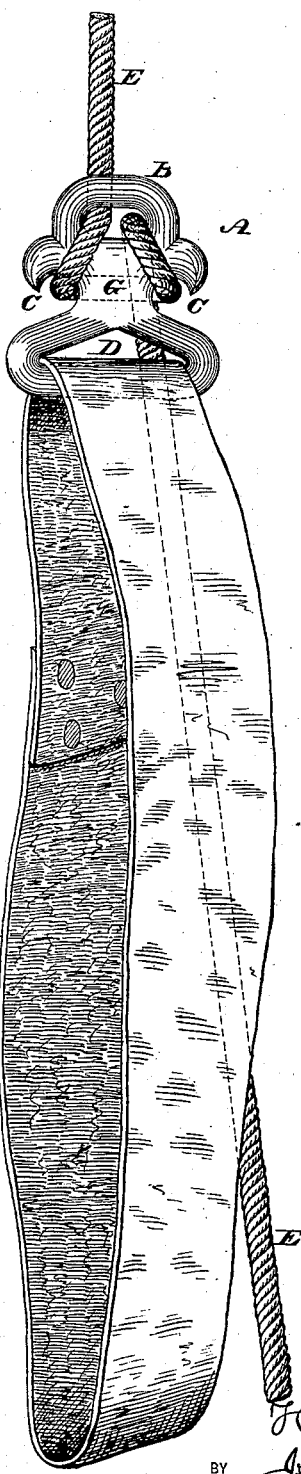
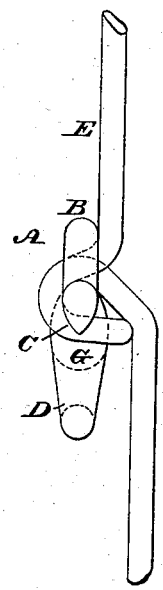
WITNESSES:
A. P. Grant
W. F. Kircher
INVENTOR:
Henry E. Braunfeld
BY John A. Wiedersheim
ATTORNEY

United States Patent Office.

HENRY E. BRAUNFELD, OF PHILADELPHIA, PENNSYLVANIA, ASSIGNOR OF ONE-HALF TO GUSTAVUS F. SCHOLLER, OF SAME PLACE.

FIRE-ESCAPE.

SPECIFICATION forming part of Letters Patent No. 316,870, dated April 28, 1885.

Application filed March 17, 1885. (No model.)

*To all whom it may concern:*

Be it known that I, HENRY E. BRAUNFELD, a subject of the Emperor of Germany, having resided one year last past in the United States and made oath of intention to become a citizen thereof, a resident of the city and county of Philadelphia, State of Pennsylvania, have invented a new and useful Improvement in Fire-Escapes, which improvement is fully set forth in the following specification and accompanying drawings, in which—

Figure 1 represents a side elevation of a fire-escape embodying my invention. Fig. 2 represents a side elevation of the same opposite to that shown in Fig. 1, the body belt or strap being removed. Fig. 3 represents a side elevation at a right angle to Fig 1.

Similar letters of reference indicate corresponding parts in the several figures.

My invention consists of a fire-escape, constructed substantially as hereinafter described, for permitting the descent of the person to whom it is attached in a reliable and easy manner.

Referring to the drawings, A represents a block, formed of suitable metal or other material, having a top loop or eye, B, side hooks, C, and bottom loop or eye, D.

E represents a rope, the same having at one end a hook, or other means for connecting it with a window, window-sill, or any suitable part of the building where the escape is to be used, said rope being passed doubled through the top loop, B, and then around the neck G of the block below the hooks C, so that while the rope is fastened to the block it is permitted to slide thereon.

The loop D is employed for the attachment of the body-strap H.

The operation is as follows: The escape is connected by the strap H with the body of the party using the escape, and the hook properly attached to a window-sill or elsewhere, the party then lowering himself while holding or paying out the loose portion of the rope in order to control the descent. The friction of the rope at the several points of contact with the block causes the block to lower with sufficient but without dangerous rapidity, the descent being, however, regulated by the party causing the rope to run around and through the block with greater or less swiftness, and consequent increased or decreased friction.

The hooks C spread the rope and prevent the lengths thereof rubbing against each other, and further prevent the portion of the rope which runs around the neck of the block from slipping therefrom to the top of the loop B, said slipping, however, while objectionable and tending to check the descent, not disconnecting the rope from the block.

Having thus described my invention, what I claim as new, and desire to secure by Letters Patent, is—

A fire-escape having a block which is formed with a top loop, side hooks, a neck, and a bottom loop, and a rope which passes through the top loop and around the neck and under the side hooks, substantially as and for the purpose set forth.

HENRY E. BRAUNFELD.

Witnesses:
 JOHN A. WIEDERSHEIM,
 A. P. GRANT.